US010560396B2

(12) United States Patent
Kairali et al.

(10) Patent No.: US 10,560,396 B2
(45) Date of Patent: *Feb. 11, 2020

(54) DYNAMIC BUFFER ALLOCATION IN SIMILAR INFRASTRUCTURES

(71) Applicant: International Business Machines Corporation, Armonk, NY (US)

(72) Inventors: Sudheesh S. Kairali, Kozhikode (IN); Vijay R. Kalangumvathakkal, Pathanamthitta (IN); Jagdish Kumar, Hyderabad (IN); Sunil Kumar S. Singh, RT-Nagar (IN)

(73) Assignee: International Business Machines Corporation, Armonk, NY (US)

( * ) Notice: Subject to any disclaimer, the term of this patent is extended or adjusted under 35 U.S.C. 154(b) by 307 days.

This patent is subject to a terminal disclaimer.

(21) Appl. No.: 15/724,730

(22) Filed: Oct. 4, 2017

(65) Prior Publication Data

US 2019/0104080 A1    Apr. 4, 2019

(51) Int. Cl.
*H04L 12/911* (2013.01)
*G06F 3/06* (2006.01)
*H04L 12/923* (2013.01)

(52) U.S. Cl.
CPC ............ *H04L 47/72* (2013.01); *G06F 3/0604* (2013.01); *G06F 3/067* (2013.01); *G06F 3/0631* (2013.01); *G06F 3/0656* (2013.01); *H04L 47/762* (2013.01)

(58) Field of Classification Search
CPC ...... H04L 47/72; H04L 47/762; G06F 3/0604
(Continued)

(56) References Cited

U.S. PATENT DOCUMENTS

2006/0045111 A1* 3/2006 Sinha .............. H04L 47/34
370/412
2007/0127690 A1* 6/2007 Patakula ............ H04M 3/5238
379/265.05

(Continued)

FOREIGN PATENT DOCUMENTS

CN      104038439      3/2017

OTHER PUBLICATIONS

List of IBM Patents or Patent Applications Treated as Related, Jan. 30, 2018, 2 pages.
(Continued)

*Primary Examiner* — Wing F Chan
*Assistant Examiner* — Leon Y Tseng
(74) *Attorney, Agent, or Firm* — Heslin Rothenberg Farley Mesiti P.C.; Scott Dobson, Esq.

(57) ABSTRACT

A method, computer program product, and system includes a processor(s) obtaining historical data related to buffer space usage of a common shared storage resource by a group of journals. The processor(s) monitors each journal over repeating temporal periods and determined a predictability for each journal (i.e., predictable or unpredictable). The processor(s) generates usage statics for each journal during each monitored period dependent on whether the journal was predictable or unpredictable during the monitored period. For each monitored period, the processor(s) ranks predictable journals by a buffer space requirement for each journal of the predictable journals. Based on the rankings, the processor(s) determined a buffer space requirement for each journal for a current period, where the current period shares temporal qualities with the given monitored period. The processor(s) allocates, for use during the current period, based on the buffer space requirement, buffer space to each journal.

8 Claims, 10 Drawing Sheets

(58) Field of Classification Search
USPC .......................................................... 709/224
See application file for complete search history.

(56) References Cited

U.S. PATENT DOCUMENTS

| | | |
|---|---|---|
| 2012/0137102 A1 | 5/2012 | Perumanam et al. |
| 2012/0191856 A1* | 7/2012 | Chen ..................... G06F 9/5083 709/226 |
| 2015/0281094 A1* | 10/2015 | Kase ..................... H04L 47/266 370/230 |
| 2017/0054828 A1* | 2/2017 | Ling ..................... H04L 67/325 |
| 2017/0063704 A1 | 3/2017 | Krinsky |
| 2017/0163739 A1 | 6/2017 | Walkin et al. |
| 2018/0248709 A1* | 8/2018 | Leydon ............... H04L 12/1859 |

OTHER PUBLICATIONS

Kairali et al., "Dynamic Buffer Allocation in Similar Infrastructures," U.S. Appl. No. 15/855,009, filed Dec. 27, 2017, pp. 1-50.
Mell et al., "The NIST Definition of Cloud Computing", National Institute of Standards and Technology, U.S. Dept. of Commerce, NIST Special Publ. 800-145, Sep. 2011, 7 pages.

* cited by examiner

BASED ON THE RANKINGS, ONE OR MORE PROGRAMS
DETERMINE (AND DETERMINE A NEW) A BUFFER SPACE
REQUIREMENT FOR EACH JOURNAL FOR EACH PERIOD

ONE OR MORE PROGRAMS DETERMINE A BUFFER SIZE
THRESHOLD FOR EACH JOURNAL BASED ON THE PREDICTABILITY,
WHICH IS BASED ON THE ANALYSIS OF THE HISTORICAL DATA ~264

ONE OR MORE PROGRAMS DETERMINE WHAT PORTION
OF ALLOCATED BUFFERS MAY BE RECLAIMED FOR
ALLOCATING TO UNPREDICTABLE JOURNALS ~266

ONE OR MORE PROGRAMS SET A BUFFER SIZE AND
A THRESHOLD BUFFER SIZE FOR EACH JOURNAL ~268

ONE OR MORE PROGRAMS DETERMINE IF THE TOTAL AVAILABLE
BUFFER SIZE IS SUFFICIENT TO MEET THE ANTICIPATED
REQUIREMENTS OF ALL THE JOURNALS, FOR EACH PERIOD ~270

BASED ON DETERMINING THE AVAILABLE BUFFER SIZE IS INSUFFICIENT,
ONE OR MORE PROGRAMS NOTIFY ADMINISTRATOR TO PROVISION
MORE SHARED STORAGE SPACE FOR ALL THE JOURNALS ~280

ONE OR MORE PROGRAMS ALLOCATE BUFFER SPACE TO EACH JOURNAL
FOR A TEMPORAL PERIOD SIMILAR TO A HISTORICAL TEMPORAL PERIOD
TO WHICH THE RANKING BEING RELIED UPON IS RELEVANT ~290

FIG. 2B

FOR JOURNAL A

| Predictable | U | U |  |  | U |  | U |  | U |  | U |  |  |  | U |  | U |  | U |
|---|---|---|---|---|---|---|---|---|---|---|---|---|---|---|---|---|---|---|---|
| Min | 4 | 3 | 3 | 5 | 6 |  | 8 | 7 | 4 | 3 | 3 |  | 6 | 7 |  | 8 | 7 | 4 | 3 |
| Max | 6 | 6 | 6 | 8 | 8 |  | 12 | 11 | 6 | 6 | 6 |  | 8 | 11 |  | 12 | 11 | 6 | 6 |
| Avg | 5 | 4.5 | 5 | 7 | 7 | 8 | 10 | 9 | 5 | 4.5 | 5 |  | 7 | 10 |  | 10 | 9 | 5 | 4.5 |
| Std-dev |  |  |  |  |  | 2 |  |  |  |  |  | 2 |  |  | 2 |  |  |  |  |

FIG. 3A

FOR JOURNAL B

| Predictable | U | U |  |  | U |  | U |  |  | U |  | U |  | U |  |  | U |  | U |
|---|---|---|---|---|---|---|---|---|---|---|---|---|---|---|---|---|---|---|---|
| Min | 2 | 3 | 4 | 3 | 3 |  | 7 | 8 |  | 3 | 5 | 6 | 8 | 7 |  | 6 | 7 |  | 3 |
| Max | 3 | 6 | 6 | 6 | 6 |  | 7 | 8 |  | 6 | 8 | 8 | 12 | 11 |  | 8 | 11 |  | 6 |
| Avg | 2.5 | 4.5 | 5 | 4.5 | 4.5 |  | 7 | 8 |  | 4.5 | 7 | 7 | 10 | 9 |  | 7 | 9 |  | 4.5 |
| Std-dev | 0.5 | 0.5 |  |  |  | 2 |  | 2 |  |  |  |  |  |  | 1 |  |  | 2 |  |

FIG. 3B

FOR JOURNAL C

| Predictable | U |  |  |  | U |  | U |  | U |  | U |  |  |  | U |  | U |  | U |
|---|---|---|---|---|---|---|---|---|---|---|---|---|---|---|---|---|---|---|---|
| Min | 4 | 3 | 3 | 5 | 6 |  | 8 | 7 | 4 | 3 | 3 |  | 6 | 7 |  | 8 | 7 | 4 | 3 |
| Max | 6 | 6 | 6 | 8 | 8 |  | 12 | 11 | 6 | 6 | 6 |  | 8 | 11 |  | 12 | 11 | 6 | 6 |
| Avg | 4.5 | 4.5 | 5 | 7 | 7 | 7 | 10 | 9 | 5 | 4.5 | 5 |  | 7 | 10 |  | 10 | 9 | 5 | 4.5 |
| Std-dev | 1 |  |  |  |  | 1 |  |  |  |  |  | 2 |  |  | 2 |  |  |  |  |

FIG. 3C

DYNAMIC BUFFER ALLOCATION IN SIMILAR INFRASTRUCTURES

BACKGROUND

In messaging systems with multiple producers and multiple consumers, producers publish the messages under a topic, for the consumers. The messaging system maintains multiple topics and the messages in these topics are partitioned and stored in persistent data structures called journals with one-to-one correspondence between a given journal and a given consumer. These journals are maintained in a shared disk storage.

SUMMARY

Shortcomings of the prior art are overcome and additional advantages are provided through the provision of a method for allocating shared buffer space to journals in a messaging system. The method includes, for instance: obtaining, by one or more processors, historical data related to buffer space usage for each journal in a group of journals comprising a messaging system, wherein each journal utilizes buffer space comprising a common shared storage resource, by monitoring activity in each journal over repeating temporal periods; determining, by the one or more processors, for each journal, based on the obtained historical data, a predictability for each journal for each monitored period of the repeating temporal periods, wherein the predictability is selected from the group consisting of: predictable and unpredictable, wherein a predictable journal, for a monitored period, uses a predictable amount of buffer space during the monitored period, and an unpredictable journal, for the monitored period, uses an unpredictable amount of buffer space during the monitored period; generating, by the one or more processors, based on the historical data, usage statistics for each journal during each monitored period, wherein the usage statistics generated for each monitored period are dependent on whether the journal was predictable or unpredictable during the monitored period; for each monitored period, ranking, by the one or more processors, predictable journals for the monitored period, by a buffer space requirement for each journal of the predictable journals; based on the rankings for a given monitored period, determining, by the one or more processors, a buffer space requirement for each journal of the group of journals for a current period, wherein the current period shares one or more temporal qualities with the given monitored period; and based on the determining, allocating, by the one or more processors, for use during the current period, based on the buffer space requirement for each journal, buffer space to each journal of the group of journals, from the buffer space in the common shared storage resource.

Shortcomings of the prior art are overcome and additional advantages are provided through the provision of a computer program product for allocating shared buffer space to journals in a messaging system. The computer program product comprises a storage medium readable by a processing circuit and storing instructions for execution by the processing circuit for performing a method. The method includes, for instance: obtaining, by one or more processors, historical data related to buffer space usage for each journal in a group of journals comprising a messaging system, wherein each journal utilizes buffer space comprising a common shared storage resource, by monitoring activity in each journal over repeating temporal periods; determining, by the one or more processors, for each journal, based on the obtained historical data, a predictability for each journal for each monitored period of the repeating temporal periods, wherein the predictability is selected from the group consisting of: predictable and unpredictable, wherein a predictable journal, for a monitored period, uses a predictable amount of buffer space during the monitored period, and an unpredictable journal, for the monitored period, uses an unpredictable amount of buffer space during the monitored period; generating, by the one or more processors, based on the historical data, usage statistics for each journal during each monitored period, wherein the usage statistics generated for each monitored period are dependent on whether the journal was predictable or unpredictable during the monitored period; for each monitored period, ranking, by the one or more processors, predictable journals for the monitored period, by a buffer space requirement for each journal of the predictable journals; based on the rankings for a given monitored period, determining, by the one or more processors, a buffer space requirement for each journal of the group of journals for a current period, wherein the current period shares one or more temporal qualities with the given monitored period; and based on the determining, allocating, by the one or more processors, for use during the current period, based on the buffer space requirement for each journal, buffer space to each journal of the group of journals, from the buffer space in the common shared storage resource.

Methods and systems relating to one or more aspects are also described and claimed herein. Further, services relating to one or more aspects are also described and may be claimed herein.

Additional features are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

FIGS. 3A-3C represent examples of hourly usage patterns for various journals, as monitored and determined by the one or more programs in some embodiments of the present invention;

DETAILED DESCRIPTION

Figure 1:
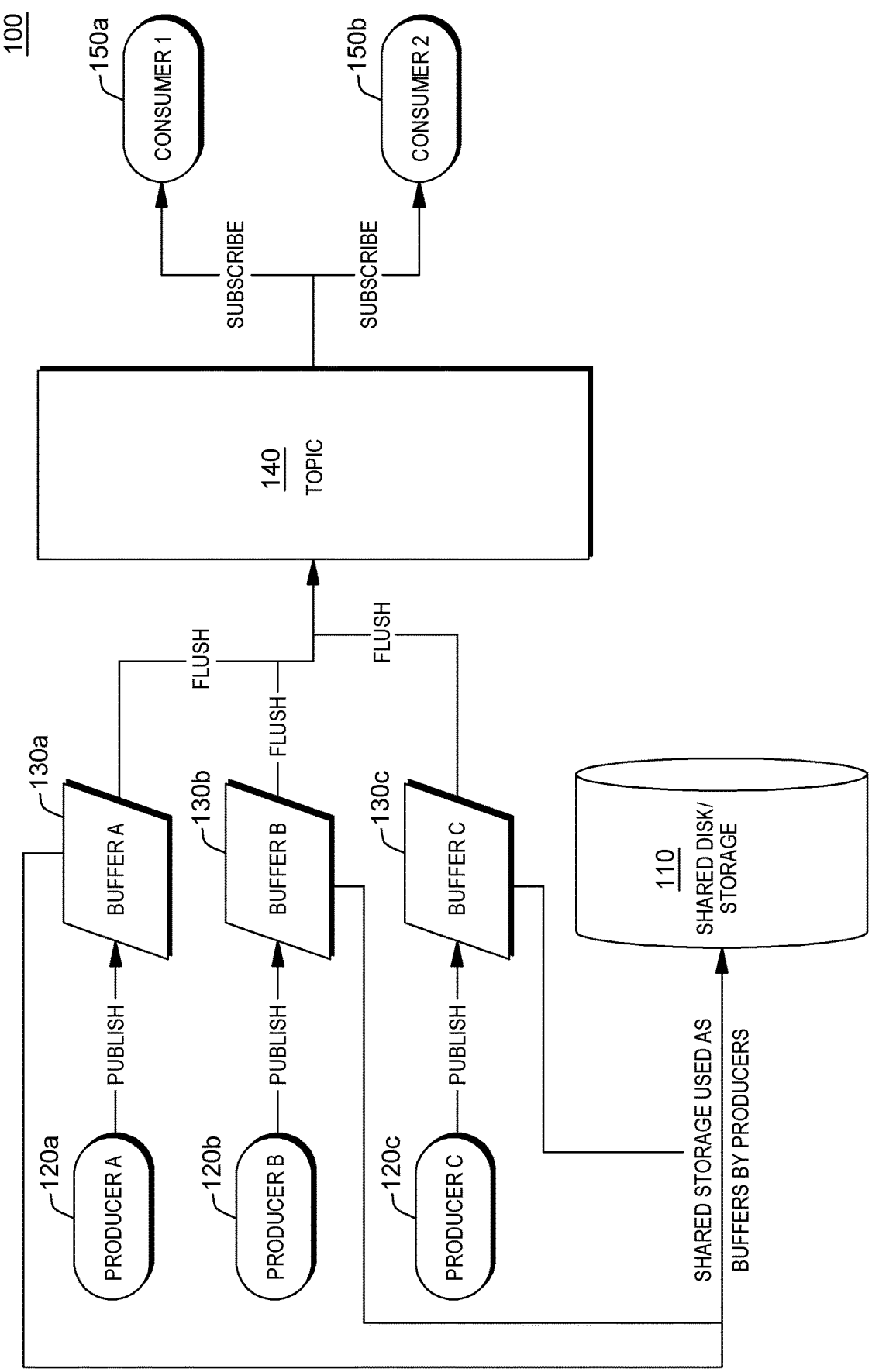
FIG. 1 is an illustration of various aspects of a technical environment in which aspects of embodiments of the present invention may be implemented.

The accompanying figures, in which like reference numerals refer to identical or functionally similar elements throughout the separate views and which are incorporated in and form a part of the specification, further illustrate the present invention and, together with the detailed description of the invention, serve to explain the principles of the present invention. As understood by one of skill in the art, the accompanying figures are provided for ease of understanding and illustrate aspects of certain embodiments of the present invention. The invention is not limited to the embodiments depicted in the figures.

Figure 8:
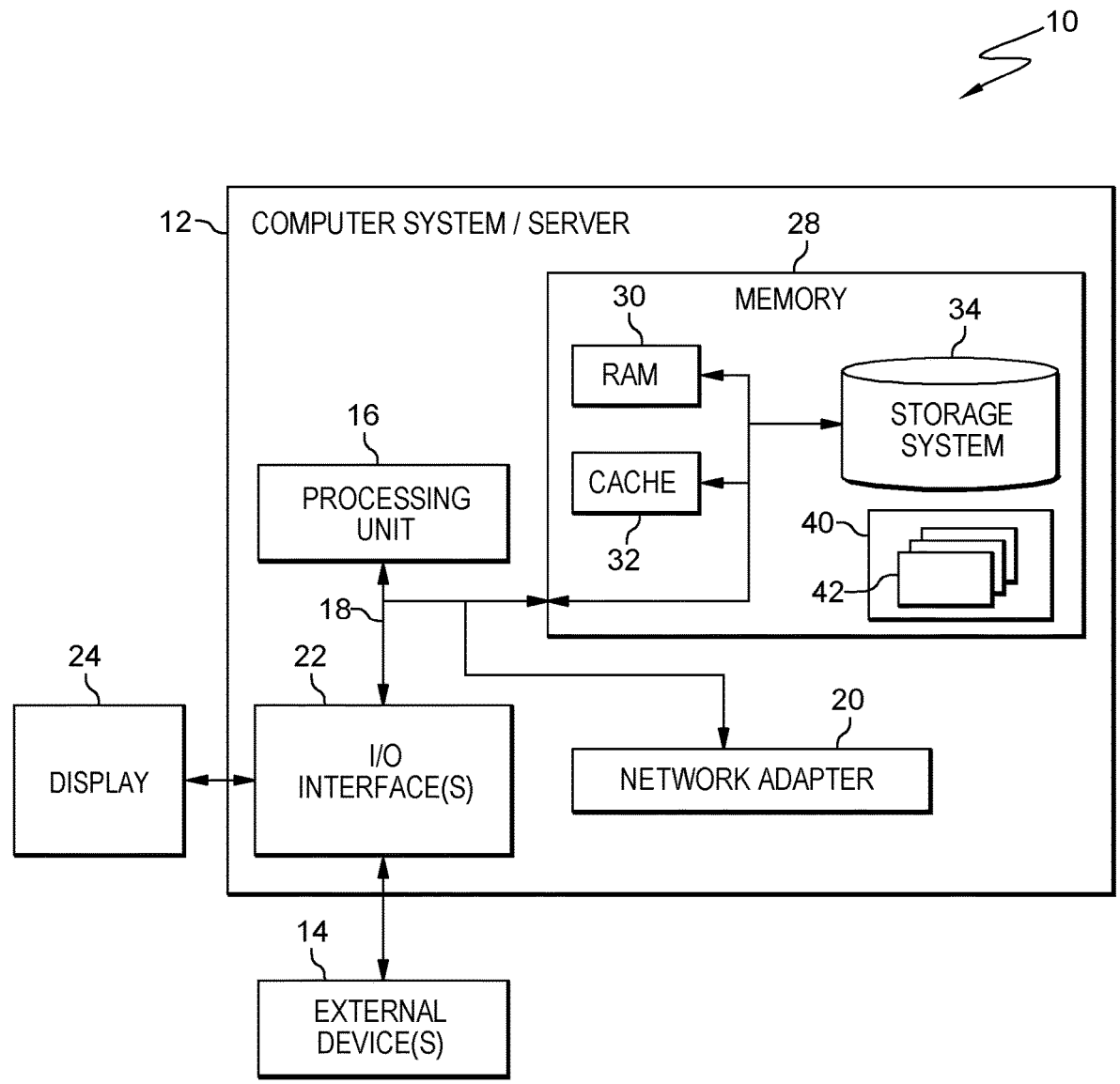
FIG. 8 depicts one embodiment of a computing node that can be utilized in a cloud computing environment.

As understood by one of skill in the art, program code, as referred to throughout this application, includes both software and hardware. For example, program code in certain embodiments of the present invention includes fixed function hardware, while other embodiments utilized a software-based implementation of the functionality described. Certain embodiments combine both types of program code. One example of program code, also referred to as one or more programs, is depicted in FIG. 8 as program/utility 40, having a set (at least one) of program modules 42, may be stored in memory 28.

In current messaging systems with multiple producers and multiple consumers, producers publish the messages under a topic for the consumers, while the messaging system maintains multiple topics. One or more programs executed by at least one processing resource in these systems partition and store the topics in journals, which are persistent data structures and are maintained in a shared disk storage. In these current systems, it is the job on an administrator to manually allocate a certain buffer space to each journal (to store the messages) until that allocated buffer space is consumed. To prevent buffer overflow, the administrator tracks of the usage patterns of the messaging system and its underlying journals and manually adjusts the buffer size for each journal, based on estimated producer and/or consumer behavior. Because the administrator will distribute all available disk storage space to allocate to the journals, an individual journal cannot release un-used (but previously allocated) storage to a common pool. To prevent available disk storage space from being underutilized through over-allocation to certain journals, based on assumptions that prove false, one or more programs monitor buffer consumption for all the journals constantly and based on data gathered through the monitoring, the administrator continuously adjusts and updates buffer sizes manually. These existing systems result in both a reactive and a manual process. Because these current systems require manual intervention, the allocation process can be both time-consuming as well as error prone.

Multiple producers/publishers share same infrastructure, but the behavior of consumers/subscribers may differ. An example of a messaging system that would benefit from the implementation of certain aspects of the present invention is a public logging and monitoring service, which includes a queue of events and messages. FIG. 1 depicts a technical architecture 100 of this public logging and monitoring service, which includes shared disk storage 110 utilized as buffers 130*a-c* (including Buffer A 130*a*, Buffer B 130*b*, and Buffer C 130*c*) by producers 120*a-c* (including Producer A 120*a*, Producer B 120*b*, and Producer C 120*c*). In this technical environment 100, one or more programs executing on at least one processor queue the logs and monitor various metrics. The consumption rate of the logs and monitoring messages may vary depending upon the capacity of log processing and message monitoring processing capabilities. The common architecture 100, including the shared disk storage 110 is shared by the services producing logs, and those producing metrics; these programs may share common buffers or share buffers that share the same storage mechanisms. The producers publish messages by topic 140 and one or more programs partition topics and store topics in one or more journals, to which the consumers 150*a-b* (including Consumer 1 150*a* and Consumer 2 150*b*) may subscribe.

Some existing systems attempt to remedy issues introduced by manually adjusting buffers by providing one or more programs to adjust buffer sizes automatically, based on historical data. Unfortunately, these approaches also fall short in efficiency and can lead to incorrect allocations, such that certain journals remove unused resources from the pool of available shared resources. The shortcomings of these systems are the result of the one or more programs failing to consider that the size of a journal may be unpredictable, in the demand for buffer space, for example, due to variations in message production and consumption patterns. In these existing systems, one or more programs monitor the buffer space usage of each journal to collect historical data. The one or more programs then analyze the historical data to build a prediction model for the buffer space used by each journal (e.g., as a function of time and the ratio of rate of consumption and rate of production). The one or more programs then automatically allocate buffer space for each journal, based on the prediction model generated, but because these models do not take into account of the unpredictability in the demand for buffer space (e.g., based on variations in the message production and consumption patterns for certain journals at certain times), space can be automatically allocated that is not required by a journal, leading to inefficiencies in the allocation of this (finite) shared space (e.g., FIG. 1, 110).

In contrast to the existing approaches described, in embodiments of the present invention, a computer-implemented method, a computer program product, and a computer system include program code that: 1) monitors the buffer space usage (i.e., buffer usage pattern) of each producer and/or publisher utilizing a messaging system by collecting historical data at regular intervals, including but not limited to, each hour of a day, each day of a week, and/or each day of a month; 2) ranks and/or adjusts earlier established rankings of the producers and/or publishers periodically; and 3) dynamically adjusts and/or readjusts the buffer sizes allocated based on the rank and/or change in rank for each producer and/or publisher. Regarding this ranking aspect, in various embodiments of the present invention, one or more programs rank publishers based on the buffer usage and time slice based analysis. This ranking is a continuous process such that the one or more programs may constantly (and/or intermittently) readjust buffer size based on this time slice based analysis. Additionally, unlike certain existing buffer allocation approaches, embodiments of the present invention may be utilized to specifically address buffer allocations where multiple producers share the same underlying infrastructure for buffer space.

Aspects of various embodiments of the present invention provide various advantages over shared resource allocation systems and methods utilized by existing messaging systems. As will be discussed in greater detail herein, one or more programs in some embodiments of the present invention provide the following advantages/functionalities: 1)

efficiency in resource allocation where no seasonality or patterns of usage exist to provide guidance; 2) efficiency in resource allocation where historical usage data indicates a mix of both predictable and unpredictable usage patterns; 3) dynamic buffer allocation based on a combination of predicted values and current usage values, to determine the best corrective action to optimize allocation efficiency, including taking corrective allocation actions, if predicted and actual usage behavior for all topics are synchronized, and localizing corrective actions when there is a deviation in a predicted and an actual usage behavior, in order to affect certain topics, only; and 4) dynamic thresholding for both predictable and unpredictable usage patterns.

Aspects of embodiments of the present invention represent improvements to existing computing technology and are inextricably tied to computing. For example, embodiments of the present invention dynamically allocate memory resources, including buffer sizes, to physical and virtual resources sharing (finite) memory resources of a computing environment. Embodiments of the present invention also rank publishers based on the buffer usage and time slice based analysis. Additionally, embodiments of the present invention address an issue inextricably tied to computing and provide a novel approach to this known issue: resource allocation inefficiencies based on either faulty and/or user-intensive manual allocations, or automated allocations that rely on historical data that fails to account for usage patterns (or lack of usage patterns) that greatly impact allocation efficiency. Space allocation in existing systems is not only inefficient, it can also lead to data loss, which is prevented by the dynamic approach provided herein. Because existing systems are unable to dynamically adjust the buffer allocation to producers by analyzing the consumption nature of corresponding consumers, data loss occurs as buffers utilized by certain producers hit an allocation ceiling, while others have plenty of storage space.

Figure 2A:
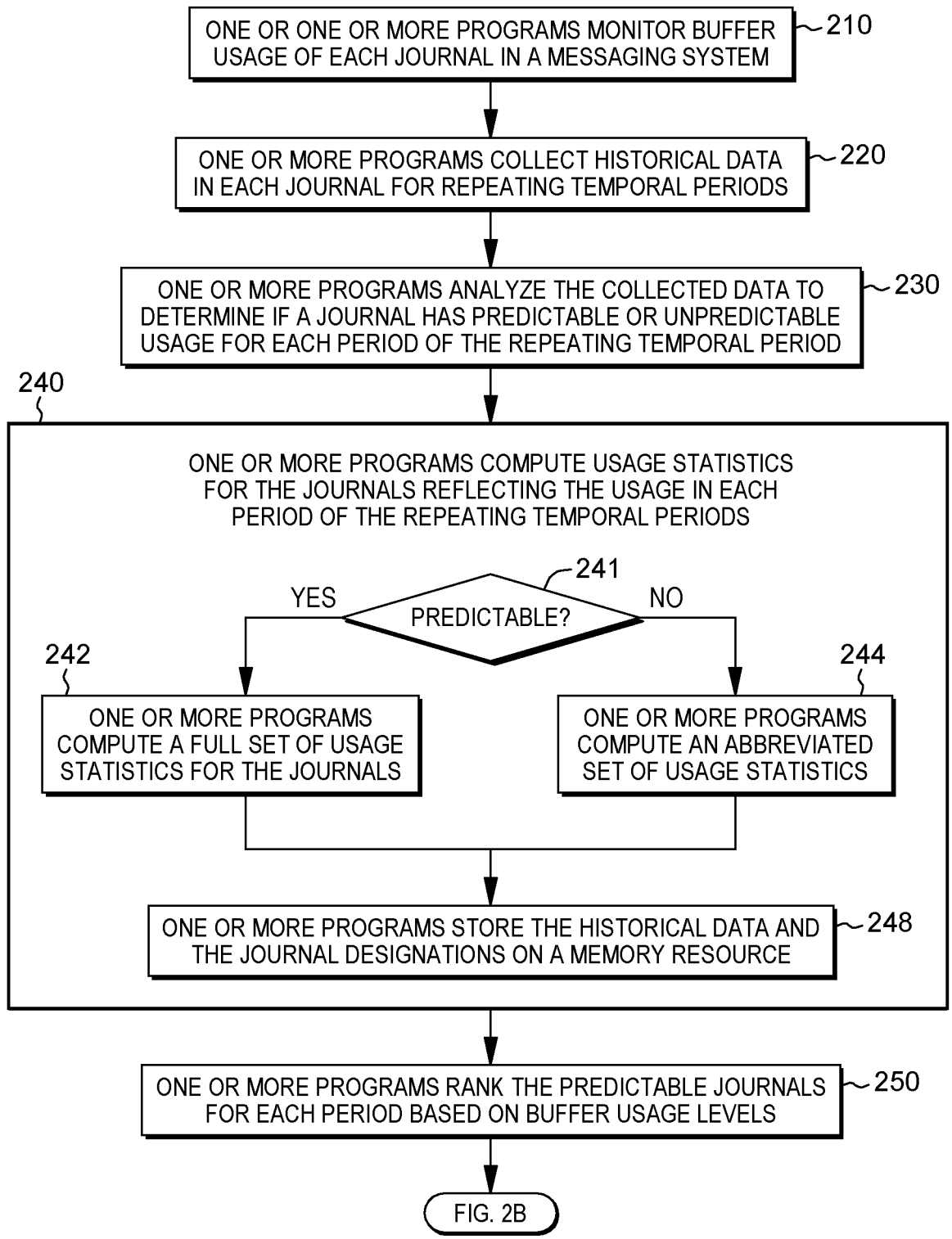
FIG. 2 (consisting of FIGS. 2A-2B) is a workflow illustrating certain aspects of an embodiment of the present invention.

FIG. 2 (comprised of FIGS. 2A-2B) is a workflow 200 that illustrates certain aspects of some embodiments of the present invention. As aforementioned, a given messaging system is utilized by one or more (generally, multiple) producers and one or more (generally, multiple) consumers. The producers publish messages by topic and one or more programs executing on at least one processing circuit, that comprises the messaging system, partitions the topics and stores them in one or more journals. Journals are persistent data structures within and/or accessible to one or more computing nodes that comprise the messaging system. The one or more programs of the messaging system distribute shared disk storage, including allocating space to the one or more journals. Specifically, the one or more programs allocate buffer space to the messages by adjusting the buffer size of the one or more journals.

As will be discussed in greater detail, the workflow 200 of FIG. 2 takes into account certain realities regarding a messaging system to efficiently manage buffer sizes of a finite shared storage resource. First, in embodiments of the present invention, one or more programs allocate buffer sizes in a manner that is inversely proportional to a ratio of consumption rate to production rate, because the behavior of the producers and the behavior of the consumers affects buffer usage, which the one or more programs utilize to determine buffer-size allocation. Second, one or more programs allocate buffer sizes and re-allocate buffer sizes based on temporal patterns of journal usage, including but not limited to, seasonal behaviors, behaviors associated with particular hours of days, behaviors associated with days of weeks, and/or behaviors associated with days of months.

Third, the one or more programs allocate buffer sizes based on observations that producers and/or consumers may deviate from a given established seasonal usage pattern. Based on these realities, one or more programs in embodiments of the present invention analyze historical buffer usage data to identify time windows (e.g., hourly) when a given journal has either a predictable (e.g., knowable) or an unpredictable (e.g., unknowable) usage pattern.

Referring to FIG. 2, in some embodiments of the present invention, one or more programs executed by at least one processing circuit monitor buffer usage of each journal in a messaging system (210). As part of the monitoring, the one or more programs collect historical data in each journal for repeating temporal periods (220). For example, in some embodiments of the present invention, the one or more programs monitor and collect data for each hour of a day, for each day of a week, and/or for each day of the month. This historical data can be usage data. By basing monitoring and collection on consistent temporal periods, one or more programs in embodiments of the present invention can identify the existence or absence of usage patterns for each journal within the defined temporal periods. These temporal periods may also be understood as time windows or time slices.

In embodiments of the present invention, the one or more programs analyze the collected data to determine if a journal has predictable or unpredictable usage for each period of the repeating temporal periods (230). The one or more programs compute usage statistics for the journals reflecting the usage in each period of the repeating temporal periods (240). As part of this computation, the one or more programs determine if each journal is predictable or unpredictable for each period of the repeating temporal periods (241). For the journals that the one or more programs determine to be predictable, the one or more programs compute a full set of usage statistics for these journals for the periods (242). Also as part of the computation, for journals that the one or more programs determine to be unpredictable (i.e., have unpredictable usage in a given temporal period), the one or more programs compute, for the temporal period, an abbreviated set of usage statistics for these journals (244). For example, in some embodiments of the present invention, for predictable journals, the one or more programs determine the minimum usage, maximum usage, average usage, and standard deviation, for the journals for each hour during a day. For unpredictable journals, the one or more programs may determine an average predicted buffer usage and a standard deviation from this average. The one or more programs store the historical data as well as the journal designations (e.g., predictable, unpredictable) on a memory resource accessible to the one or more processors (248).

FIGS. 3A-3C represent examples of hourly usage patterns for journals A, B, and C, as monitored and determined by the one or more programs in some embodiments of the present invention. As illustrated in FIGS. 3A-3C, for different time slices (temporal periods) the one or more programs determine that the usage patterns for a given journal may be predictable or unpredictable. FIG. 3A is related to Journal A, FIG. 3B to Journal B, and FIG. 3C to Journal C.

Referring to FIG. 3A, which provides data related to usage of Journal A during different temporal periods, the one or more programs determined that the journal's usage was unpredictable for five time slices or windows. For the remainder of the periods, the one or more programs determined that the journal was predictable. As depicted in FIG. 2, the one or more programs computed usage statistics including minimum, maximum, average, and standard deviation, for the periods where Journal A was predictable (242) and usage statistics including only average and standard deviation, for Journal A for periods that the one or more programs determined that the usage was unpredictable (244). FIG. 3B provides the same usage statistics for Journal B and FIG. 3C provides these computed values for Journal C.

Returning to FIG. 2, based on the computed usage, for the relevant temporal period for which the one or more programs determine whether each journal was predictable or unpredictable (e.g., hour-of-day, day-of-week, and/or day-of-month), the one or more programs rank the predictable journals for each period based on buffer usage levels (250). The rankings result in a per-temporal period ranking index for each journal. In embodiments of the present invention, the one or more programs utilize machine learning application programming interfaces (APIs) in order to generate the rankings. In embodiments of the present invention, certain of the APIs may be part of a known cognitive agent, such as the IBM Watson® Application Program Interface (API), a product of International Business Machines Corporation. IBM Watson® is a registered trademark of International Business Machines Corporation, Armonk, N.Y., US. In some embodiments of the present invention, APIs utilized by the one or more programs may include, but are not limited to, Retrieve and Rank (i.e., a service available through the IBM Watson® Developer Cloud that can surface the most relevant information from a collection of documents), concepts/visual insights, trade off analytics, document conversion, and/or relationship extraction.

The one or more programs determine (and determine anew) a buffer space requirement for each journal as each period of the temporal periods utilized for the rankings elapses (260). To make this determination, for each temporal period (i.e., time window or time slice, e.g., each hour) the one or more programs utilize the rankings to determine a buffer space requirement for each journal. For each temporal period, the one or more programs determine a buffer size threshold for each journal, based on the predictability, which is based on the analysis of the historical data (264). The one or more programs may utilize the threshold determinations to detect or predict a service level (SLA) breach. For each temporal period, the one or more programs determine what portion of allocated buffers may be reclaimed for allocating to unpredictable journals (266). The portion of the buffers that can be reclaimed refer to portions of the buffer that had been previously allocated to a predictable journal, which are not going to be needed, based on the predictions, and can therefore be re-allocated. The one or more programs may reclaim these portions for use by the unpredictable journals because the future space requirements of these journals cannot be determined by the one or more programs, based on the historical data. For each temporal period, for each journal, the one or more programs set the buffer size and set the threshold buffer size (268).

Returning to the example journals in FIGS. 3A-3C, and using an hour as an example of a temporal period, the one or more programs rank (e.g., FIG. 2, 250) the journals by ranking the predictable journals in decreasing order of usage pattern for a given hour, excluding the unpredictable journals, from the rankings. At each hour, based on the ranking for that hour of the day, the one or more programs determine the buffer space requirement for each journal (e.g., FIG. 2, 260). As illustrated in FIGS. 3A-3C, for the predictable journals, or, rather, the journals that are predictable during a relevant time period, for that time period (e.g., an hour), the one or more program determine the buffer space requirements by utilizing the minimum and maximum buffer usage values. Upon determining the space requirements for the predictable journals, the one or more programs redistribute the remaining buffer space to the journals previously determined to be unpredictable during the time period by utilizing the hour-of-day average predicted buffer usage values, as illustrated in FIGS. 3A-3C. For example, the one or more programs may weigh the day of-week, day-of-month ranking, and average predicted buffer usage to determine the allocated buffer-size for the unpredictable journals. In the event that the one or more programs determined that all the journals were predictable for a given hour (the temporal period utilized in this example), the one or more programs reserve any unallocated buffer space in a pool that the one or more programs may reclaim if/when a journal becomes unpredictable.

Per FIG. 3A, the one or more programs determined that Journal A is predictable for hour 00:00-01:00. An example of an allocated buffer size for Journal A, for that time, based on the maximum usage can be 6 units (100% of 6). Per FIGS. 3B and 3C, in the same time period, in the same time period, hour 00:00-01:00, the one or more programs determined that Journal B (see FIG. 3B) and Journal C (see FIG. 3C) are unpredictable. If the total shared space is 20 units, after the allocation to Journal A, the remaining space is 14 units. Thus, the one or more programs determine how to allocate the remaining 14 units of space between Journal B and Journal C. Referencing the collected and computed data, the one or more programs determine that the ratio of the average buffer space of Journal B to Journal C is 2:4. The average space for the relevant time period for Journal B is 2 units (see FIG. 3B) and the average space for the time period for Journal C is 4 units (see FIG. 3C). Thus, the one or more programs determine the allocation for Journal B by multiplying the average allocation for Journal B during the relevant time by the available buffer space and divide that result by the space allocated to Journal A, allocating 4.3 units to Journal B (i.e., 2*14/6=4.3). The one or more programs determine how much buffer space to allocate to Journal C by multiplying the average allocation for Journal C during the relevant time by the available buffer space and divide that result by the space allocated to Journal A, allocating 9.3 units (i.e., 4*14/6=9.3).

As illustrated in FIG. 2, based on identifying the pattern in the time window, the one or more programs may continuously, as well as periodically, reallocate the buffer sizes of the journals, for usage periods in which the usage of journals is predictable or unpredictable. The one or more programs determine the buffer usage (e.g., minimum, maximum, average, and/or a standard deviation) for time-windows and utilize this information to allocate the buffer sizes of journals, dynamically. The one or more programs allocate buffer space to journals for time windows in which the one or more programs determine that utilization of these journals is predictable (e.g., hourly) and re-distribute the remaining buffer space of the shared storage to journals that the one or more programs for which the one or more programs have determined that the utilization for the time windows is unpredictable. In embodiments of the present invention, the one or more programs determine whether usage is predictable or unpredictable for a given journal during a given time window by analyzing average usage extracted from the historical data.

As illustrated in FIG. 2, for each temporal period, the one or more programs determine a buffer size threshold for each journal based on the predictability, which is based on the analysis of the historical data which one or more programs may utilize the threshold determinations to detect or predict a service level (SLA) breach (268). Referring to the example journals, Journal A, Journal B, and Journal C, at each hour, the one or more programs determine the buffer-size thresholds, based on the predictability. In some embodiments of the present invention, if the one or more programs determine that the buffer size is predictable for the journal, then the one or more programs set the buffer size threshold as 90% of the maximum value. If the one or more programs determine that the buffer size is unpredictable, then the one or more programs set the buffer-size threshold as a function of average predicted buffer usage and the standard deviation from the predicted buffer usage.

Referring to FIG. 3A, the one or more programs can determine a buffer side threshold for Journal A, for a given temporal period. For the predictable hour of 00:00-01:00, the one or more programs may determine that the buffer size threshold is 90% of the maximum value is, 6 units (i.e., 90% of 6). For the unpredictable hour of 05:00-06:00, because the average is 7 units, and the standard deviation ($\sigma$) 2 units, the one or more programs may determine the buffer size threshold as 7+3*2, calculated using the average+3*$\sigma$.

Returning to FIG. 2, for each temporal period, the one or more programs determine what portion of the buffers may be reclaimed for unpredictable journals (266). In some embodiments of the present invention, the one or more programs determine buffer reclaim limits for the unpredictable journals every temporal period (e.g., every hour), as a function of the average predicted buffer usage and the standard deviation from the predicted buffer usage. The average predicted buffer usage and the standard deviation from the predicted buffer usage may comprise the abbreviated set of usage statistics determined by the one or more programs (e.g., FIG. 2, 244). Returning to Journal A, as depicted in FIG. 3A, for the unpredictable hour of 05:00-06:00 the average is 7 and the standard deviation ($\sigma$) is 2. The buffer reclaim limit is 7+6*2, calculated using the average+6*$\sigma$. Thus, in this example, the allocated buffer less 7+6*2 is available for the one or more programs to reclaim from Journal A, at the relevant temporal period, which in this case, is at a given hour.

Returning to FIG. 2, the one or more programs determine if the total available buffer size is sufficient to meet the anticipated requirements of all the journals, for each period of the temporal periods (270). Based on determining that the total available buffer size is insufficient, the one or more programs may notify the Administrator (an individual or a program) to provision (manually or automatically) more shared storage space for all the journals (280).

Based on determining a buffer space requirement for each journal for each period, the one or more programs allocate buffer space (e.g., from shared space) to each journal for a temporal period similar to an historical temporal period, to which the ranking being relied upon are relevant (290). Because the one or more programs can associate historical temporal periods with current periods (e.g., based on a commonality of season, time of day, time of month, etc.), the one or more programs can allocate buffer space based both upon a perceived predictability of buffer space usage in a given journal for a given temporal period, as well as based on a perceived unpredictability of buffer space usage.

Figure 4:
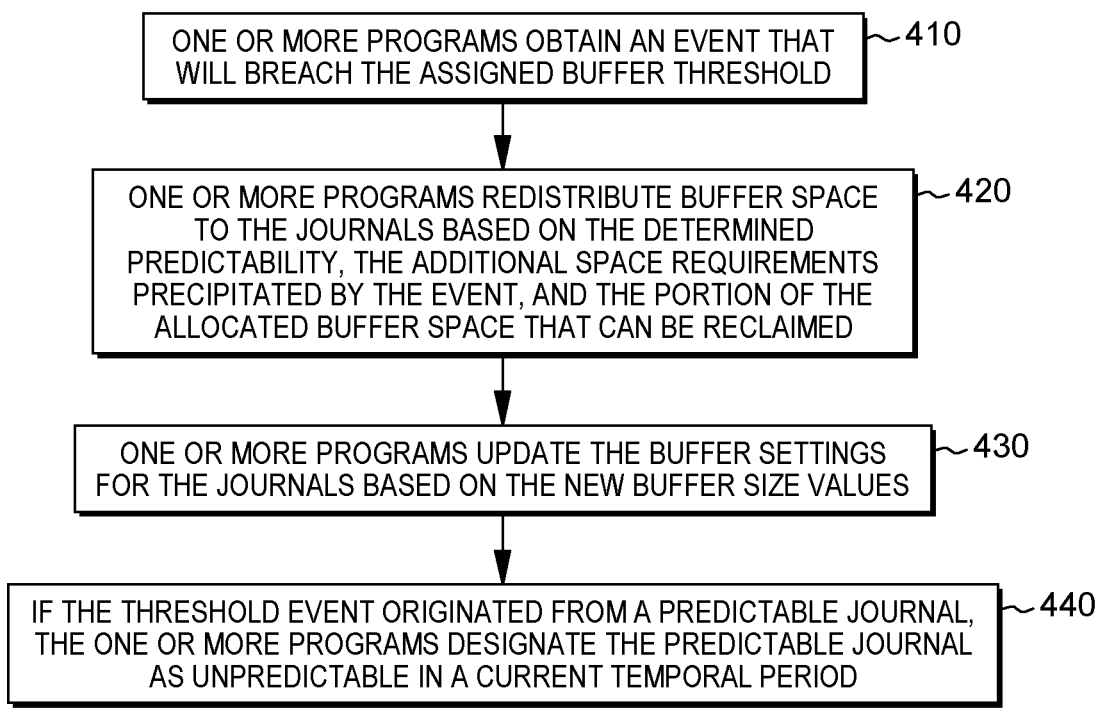
FIG. 4 is a workflow illustrating certain aspects of an embodiment of the present invention.

As illustrated in workflow 400 of FIG. 4, although one or more programs in embodiments of the present invention guard against breaches of threshold limits by anticipating and continuously adjusting and readjusting buffer sizes of journals (e.g., FIG. 2, 260), embodiments of the present invention include contingencies in case an assigned buffer limit is breached by an (unanticipated) event. In embodiments of the present invention, the one or more programs obtain an event that will breach the assigned buffer threshold (410) and determine buffer requirements based on the event. For example, as illustrated in FIG. 4, if the event originated from a predictable journal, the one or more programs mark that journal as unpredictable for the current temporal period. The one or more programs determine an additional buffer requirement for this journal until the end of the temporal period, based on the rate of change of actual buffer usage. The one or more programs determine the buffer space to release from the rest of the unpredictable journals, based on actual buffer usage, buffer reclaim limits, average predicted buffer usage, and standard deviation from predicted buffer usage. The one or more programs re-compute the buffer-size threshold settings and the buffer reclaim limits for the unpredictable journals, based on the new reallocation plans.

Referring to FIG. 4, the one or more programs redistribute buffer space to the journals based on the determined predictability, the additional space requirements precipitated by the event, and the portion of the allocated buffer space that can be reclaimed (420). The one or more programs update the buffer settings for the journals based on the new buffer size values (430). If the threshold event originated from a predictable journal, the one or more programs designate this journal as unpredictable in the current temporal period (i.e., time window) (440).

As aforementioned, the one or more programs can define the dynamic threshold to detect an SLA breach, for all the journals, based on historical trends, and periodically update this threshold. Thus, when a threshold-based event is raised by a journal, the one or more programs may analyze the actual buffer usage trend (in the current time window) of the journal, to estimate the additional buffer-size required for the journal (based on rate of change).

In some embodiments of the present invention, one or more programs may reclaim buffer space for a journal experiencing a threshold event from an unpredictable journal. In an aspect of some embodiments of the present invention, the one or more programs analyze the actual usage of all the unpredictable journals and compare the actual usage with the corresponding predicted usage (roughly predicted based on historical data) to reclaim some buffer space. For example, the buffer size reclaimed from the unpredictable journals is proportional to its actual usage, predicted usage, and predicted standard deviation (based on historical data).

Figure 5:
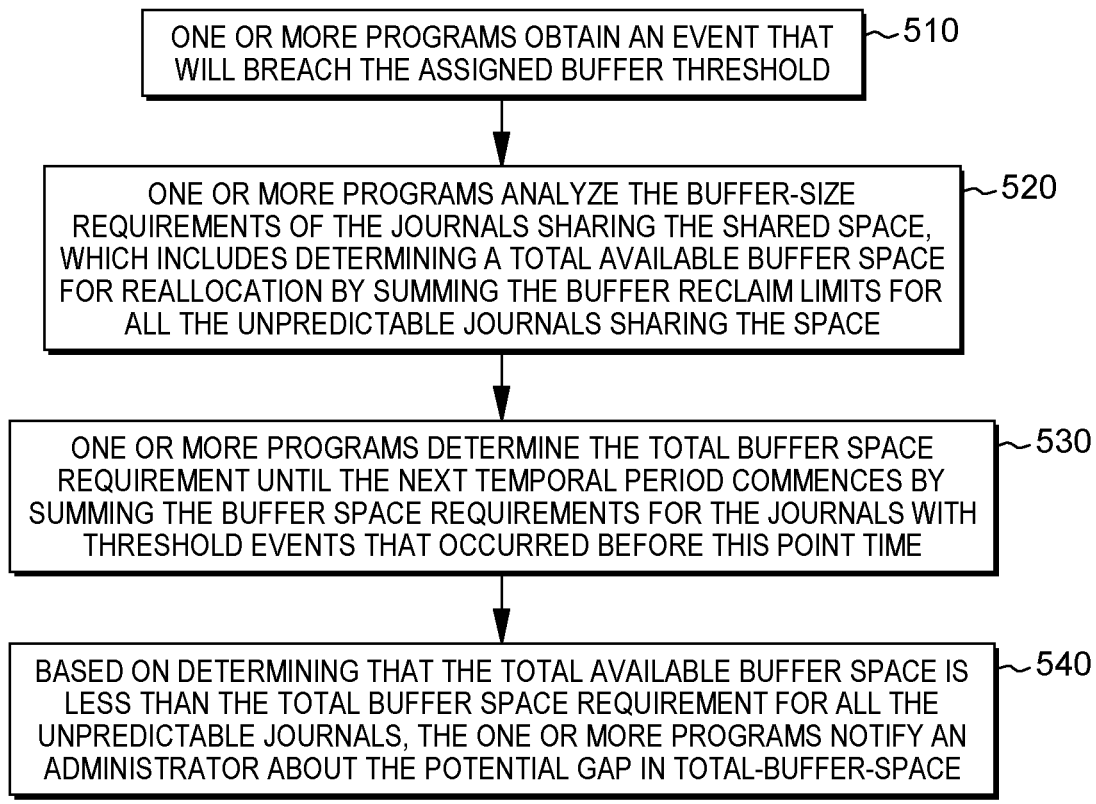
FIG. 5 is a workflow illustrating certain aspects of an embodiment of the present invention.

FIG. 5 is a workflow 500 depicting certain aspects of some embodiments of the present invention precipitated, as in FIG. 4, by the receipt of an event that will breach an assigned buffer threshold. Upon receipt of the event (510), the one or more programs analyze the buffer-size requirements of the journals sharing the shared space, which includes determining a total available buffer space for reallocation by summing the buffer reclaim limits for all the unpredictable journals sharing the space (520). The one or more programs determine the total buffer space requirement, until the next temporal period commences, by summing the buffer space requirements, for the journals, with threshold events, that occurred before this point time (530). Based on determining that the total available buffer space is less than the total buffer space requirement for all the unpredictable journals, the one or more programs notify an administrator about the potential gap in total-buffer-space (540). The one or more programs may also request additional shared space to mitigate the anticipated issue.

Figure 6:
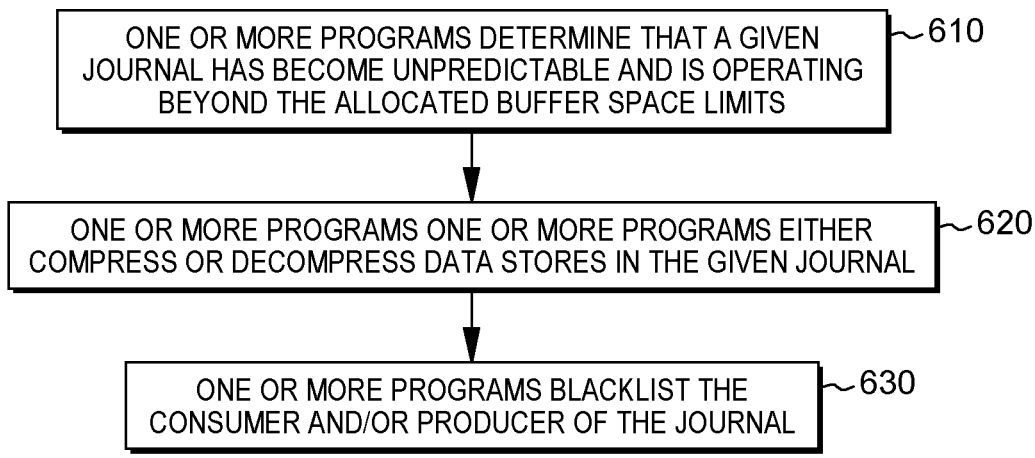
FIG. 6 is a workflow illustrating certain aspects of an embodiment of the present invention.

As illustrated in workflow 600 of FIG. 6, some of the journals are unpredictable, and others may become unpredictable, which can potentially complicate the ability of the one or more programs to anticipate, reliably, buffer space requirements. Thus, in some embodiments of the present invention, the one or more programs may determine that a given journal has become unpredictable and is operating beyond the allocated buffer space limits (610), resulting in higher central processing unit (CPU) resource utilization (with some performance degradation). The one or more programs may respond to this behavior utilizing the approach illustrated in FIG. 6. Based on determining that a given journal has become unpredictable and is operating beyond the allocated buffer space limits, the one or more programs either compress or decompress data stores in the given journal (620) resulting in higher central processing unit (CPU) resource utilization (with some possible performance degradation). The one or more programs may also blacklist the consumer and/or producer of the journal (630), to block the source of the problematic behavior. One or more programs may also notify a messaging system administrator of the issue with the journal.

A given journal has become unpredictable and is operating beyond the allocated buffer space limits can be understood as a "rouge" journal. In embodiments of the present invention, one or more programs can automatically detect rouge journals. A journal becomes a rouge journal when a producer continuously generates data at a very high rate (compared to rate of consumption), such that the buffer consumption increases continuously. The effects of rogue journals on the messaging system can be mitigated because the one or more programs in embodiments of the present invention repeatedly (and continuously) re-plan and re-distribute the allocated buffers of the unpredictable journals.

Figure 7:
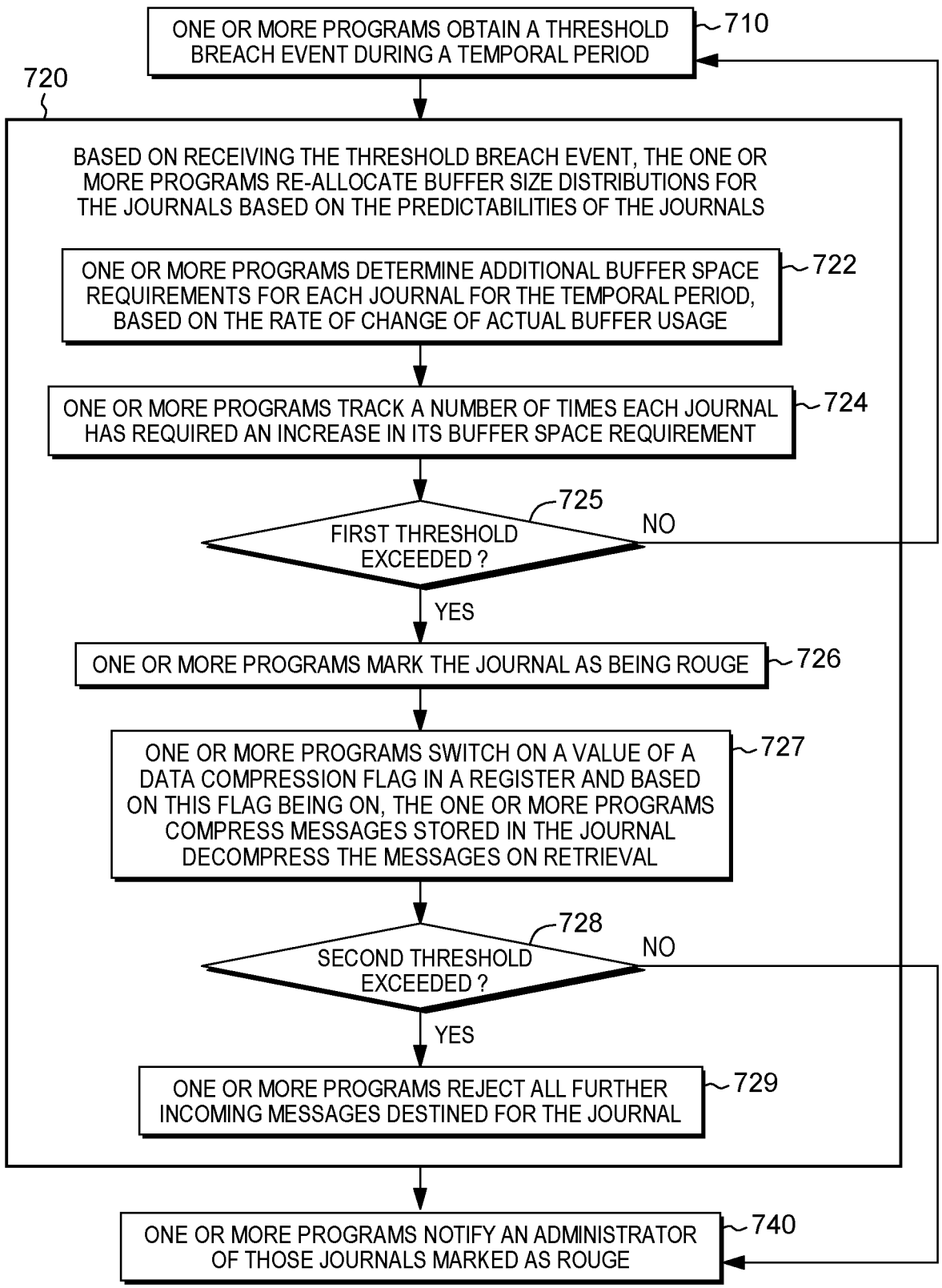
FIG. 7 is a workflow illustrating certain aspects of an embodiment of the present invention.

FIG. 7 is a workflow 700 of some embodiments of the present invention that illustrates how the one or more programs mitigate the potential effects of one or more rogue journals on the functionality of the messaging system. In order to avoid these issues, the one or more programs identify journals as being problematic and reject content that would potentially stretch buffer limits within these journals. In some embodiments of the present invention, the one or more programs obtain a threshold breach event during a temporal period (710). Based on receiving the threshold breach event, the one or more programs re-allocate buffer size distributions for the journals based on the predictabilities of the journals (720). To re-allocate the buffer size distributions, the one or more programs determine additional buffer space requirements for each journal for the temporal period, based on the rate of change of actual buffer usage (722). The one or more programs track a number of times each journal has required an increase in its buffer space requirement (724). The one or more programs determine if the number of times increases in buffer space have been required exceed a predetermined tolerance threshold (725). In some embodiments of the present invention, this threshold is three (3). Based on the adjustments for a journal exceeding the threshold, the one or more programs mark the journal as being rouge (726). Based on identifying a journal as rogue, the one or more programs switch on a value of a data compression flag in a register (e.g., set the flag to true) and based on this flag being on, the one or more programs compress messages stored in the journal decompress the messages on retrieval (727). The one or more programs notify an administrator (e.g., a program) of those journals marked as rouge (730).

In some embodiments of the present invention, the one or more programs may utilize two different thresholds in order to determine how to handle a potentially rogue journal. While violating a lower threshold may cause the one or more programs to identify the journal as rogue (726) and compress the associated data (727), should the one or more programs determine that the number of times increases in buffer space have been required exceed a higher predetermined tolerance threshold, the one or more programs may take further actions in order to prevent the problematic journal from creating issues within the messaging system. In an embodiment of the present invention, when the one or more programs determine that the number of times increases in buffer space have been required exceed a second predetermined tolerance threshold (728), where the second threshold exceeds the initial threshold, the one or more programs, and the one or more programs previously identified the journal as rogue, the one or more programs reject all further incoming messages destined for the journal (729). In an embodiment of the present invention, the initial threshold is three (3), while the second threshold is six (6).

Because the one or more programs consistently evaluate previous allocations and journal sizes, a journal that the one or more programs determined to be rogue can be re-classified. In an embodiment of the present invention, the one or more programs monitor all rogue journals at regular intervals. These regular intervals may be smaller than the temporal periods. For example, when a temporal period is an hour, this interval may be thirty (30) minutes or fifteen (15) minutes. During these checks, if the one or more programs determine that rate of change of actual buffer usage is negative, and the actual buffer usage is less than the buffer size threshold, the one or more programs remove the rouge designation from the journal and turn off the data compression tag.

Embodiments of the present invention include a computer-implemented method, a computer program product, and a computer system that include one or more programs that obtain historical data related to buffer space usage for each journal in a group of journals comprising a messaging system, wherein each journal utilizes buffer space comprising a common shared storage resource, by monitoring activity in each journal over repeating temporal periods. The one or more programs determine, for each journal, based on the obtained historical data, a predictability for each journal for each monitored period of the repeating temporal periods, where the predictability is selected from the group consisting of: predictable and unpredictable, where a predictable journal, for a monitored period, uses a predictable amount of buffer space during the monitored period, and an unpredictable journal, for the monitored period, uses an unpredictable amount of buffer space during the monitored period. The one or more programs generate, based on the historical data, usage statistics for each journal during each monitored period, where the usage statistics generated for each monitored period are dependent on whether the journal was predictable or unpredictable during the monitored period. For each monitored period, the one or more programs rank predictable journals for the monitored period, by a buffer space requirement for each journal of the predictable journals. Based on the rankings for a given monitored period, the one or more programs determine a buffer space requirement for each journal of the group of journals for a current period, where the current period shares one or more temporal qualities with the given monitored period. Based on this determination, the one or more programs allocate, for use during the current period, based on the buffer space requirement for each journal, buffer space to each journal of the group of journals, from the buffer space in the common shared storage resource.

In some embodiments of the present invention, the one or more programs determine the buffer space requirement for each journal of the group of journals for the current period by determining a buffer size threshold for each journal based on the predictability of each journal for the given monitored period. The one or more programs also determine a portion of the buffer space in the common shared storage resource allocated to one or more journals of the predictable journals in the given monitored period, available to reclaim for allocating to one or more journals of the unpredictable journals in the given monitored period, the use during the current period; and set a buffer size and a threshold buffer size for each journal.

In some embodiments of the present invention, in advance of or during a second period, the one or more programs obtain an event related to one or more journals. The one or more programs determine that the event that will breach the threshold buffer size of the one or more journals of the group of journals during the second period. The one or more programs determine additional buffer space requirements for the one or more journals, based on the event. The one or more programs also automatically reallocate a portion of buffer space in the common shared storage resource to the one or more journals, based on predictability of the one or more journals during a second monitored period, wherein the second monitored period and the second period share one or more common temporal qualities, the additional space requirements, and the portion of the buffer space available to reclaim.

In some embodiments of the present invention, the one or more programs designate the one or more journals previously determined to be predictable for the second monitored periods as unpredictable for the second monitored period.

In some embodiments of the present invention, in reallocating the portion of buffer space, the one or more programs determine an additional buffer space requirement for each journal for the second period, based on the rate of change of actual buffer usage of each journal.

In some embodiments of the present invention, the one or more programs monitor a number of times the one or more processors automatically re-allocate buffer space to each of the one or more journals, based on obtaining events related to the one or more journals. Based on the number exceeding a first threshold, the one or more programs designate the one or more journals as rogue. The one or more programs compress messages stored in the one or more journals. In some embodiments of the present invention, based on the number exceeding a second threshold, the one or more programs reject all further incoming messages destined for the one or more journals. The second threshold may exceed the first threshold.

In some embodiments of the present invention, the one or more programs notify an administrator that the one or more journals were designated rogue.

In some embodiments of the present invention, the one or more programs generate the usage statistics for each journal during each monitored period for a predictable journal by determining, for predictable journals in the group of journals, a minimum usage, a maximum usage, an average usage, and a standard deviation and for unpredictable journals in the group of journals, an average predicted buffer usage and a standard deviation from the average predicted buffer usage.

In some embodiments of the present invention, the one or more programs allocate buffer space to each journal of the group of journals by determining a combined buffer space requirement for the group of journals. The one or more programs also determine that buffer space comprising the common shared storage resource is less than combined buffer space requirement. The one or more programs also notify an administrator to provision additional shared storage space for the messaging system.

In some embodiments of the present invention, based on the rankings for a second given monitored period, for a period subsequent to the current period, the one or more programs determine an updated buffer space requirement for each journal of the group of journals for the period subsequent to the current period, wherein the period subsequent to the current period shares one or more temporal qualities with the second given monitored period. Based on the determining, the one or more programs adjust, for use during the a period subsequent to the current period, based on the updated buffer space requirement for each journal, the buffer space allocated to each journal of the group of journals, from the buffer space in the common shared storage resource.

Referring now to FIG. 8, a schematic of an example of a computing node, which can be a cloud computing node 10. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove. In an embodiment of the present invention, the producers 120a-120c (FIG. 1), the consumers 150a-150b (FIG. 1) and the shared disk storage 110 can all be understood as part of a cloud computing node 10 (FIG. 8) and if not a portion of a cloud computing node 10, then one or more general computing node that includes aspects of the cloud computing node 10.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, computer system/server 12 that can be utilized as cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs). Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter). Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 9:
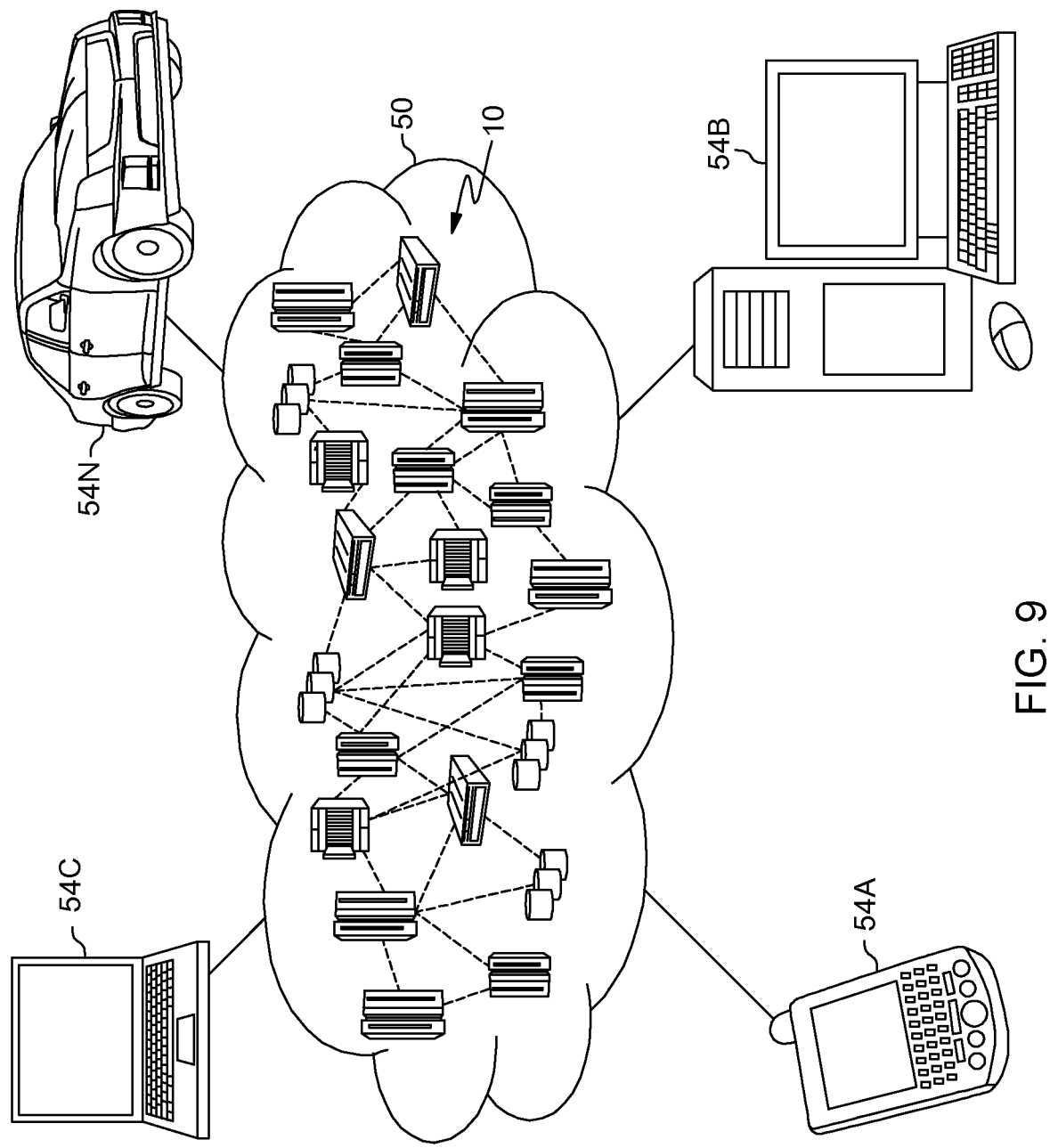
FIG. 9 depicts a cloud computing environment according to an embodiment of the present invention.

Referring now to FIG. 9, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 9 are intended to be illustrative only and that computing nodes 10 and cloud computing environment 50 can communicate with any type of computerized device over any type of network and/or network addressable connection (e.g., using a web browser).

Figure 10:
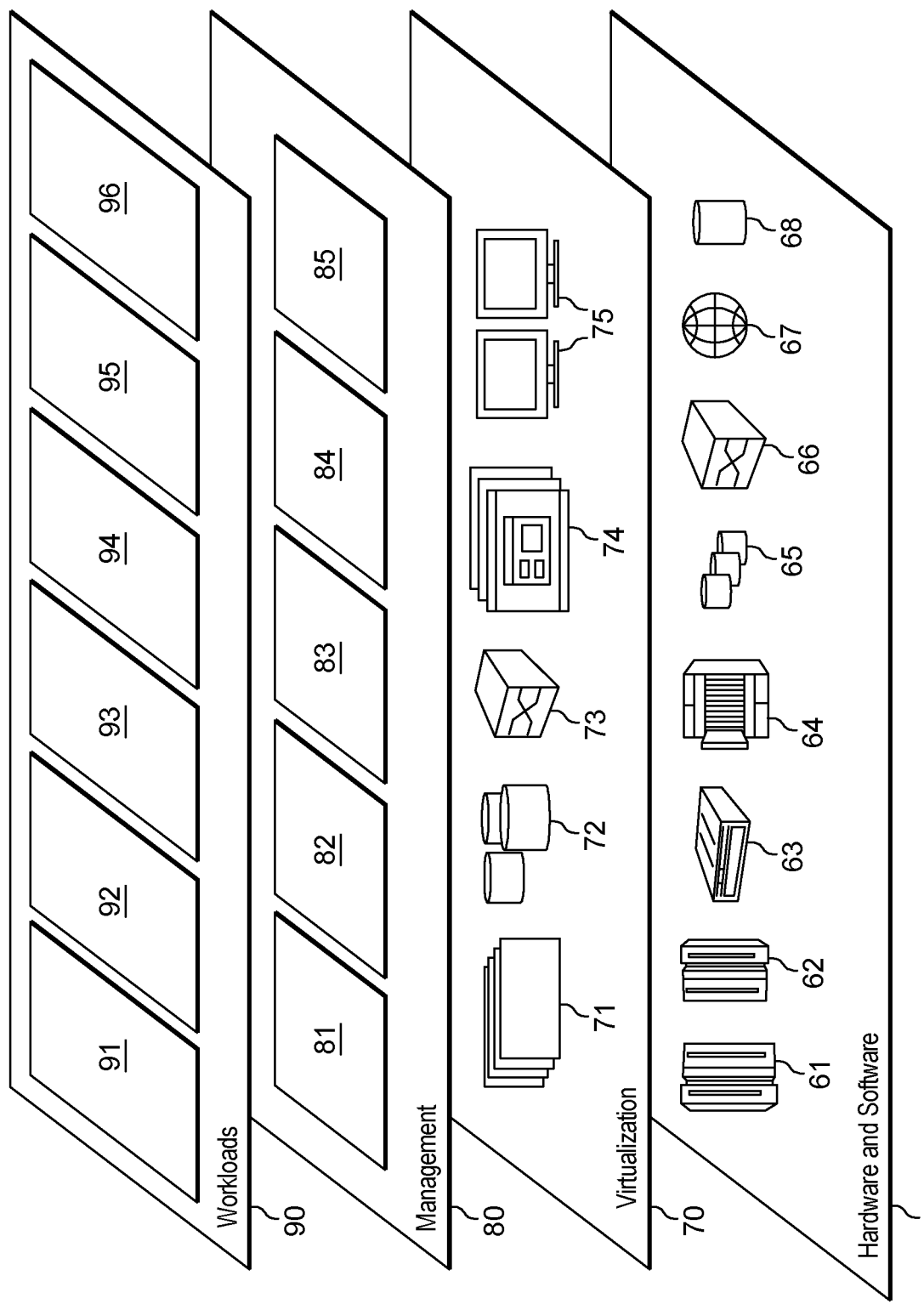
FIG. 10 depicts abstraction model layers according to an embodiment of the present invention.

Referring now to FIG. 10, a set of functional abstraction layers provided by cloud computing environment 50 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and allocating shared buffer space 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer program product comprising:
 a computer readable storage medium readable by one or more processors and storing instructions for execution by the one or more processors for performing a method comprising:
   obtaining, by one or more processors, historical data related to buffer space usage for each journal in a group of journals comprising a messaging system, wherein each journal utilizes buffer space comprising a common shared storage resource, by monitoring activity in each journal over repeating temporal periods;

determining, by the one or more processors, for each journal, based on the obtained historical data, a predictability for each journal for each monitored period of the repeating temporal periods, wherein the predictability is selected from the group consisting of: predictable and unpredictable, wherein a predictable journal, for a monitored period, uses a predictable amount of buffer space during the monitored period, and an unpredictable journal, for the monitored period, uses an unpredictable amount of buffer space during the monitored period;

generating, by the one or more processors, based on the historical data, usage statistics for each journal during each monitored period, wherein the usage statistics generated for each monitored period are dependent on whether the journal was predictable or unpredictable during the monitored period;

for each monitored period, ranking, by the one or more processors, predictable journals for the monitored period, by a buffer space requirement for each journal of the predictable journals;

based on the rankings for a given monitored period, determining, by the one or more processors, a buffer space requirement for each journal of the group of journals for a current period, wherein the current period shares one or more temporal qualities with the given monitored period; and based on the determining, allocating, by the one or more processors, for use during the current period, based on the buffer space requirement for each journal, buffer space to each journal of the group of journals, from the buffer space in the common shared storage resource.

2. The computer program product of claim 1, wherein determining the buffer space requirement for each journal of the group of journals for the current period comprises:

determining, by the one or more processors, a buffer size threshold for each journal based on the predictability of each journal for the given monitored period;

determining, by the one or more processors, a portion of the buffer space in the common shared storage resource allocated to one or more journals of the predictable journals in the given monitored period, available to reclaim for allocating to one or more journals of the unpredictable journals in the given monitored period, the use during the current period; and setting, by the one or more processors, a buffer size and a threshold buffer size for each journal.

3. The computer program product of claim 2, further comprising:

in advance of or during a second period, obtaining, by the one or more processors, an event related to one or more journals;

determining, by the one or more processors, that the event that will breach the threshold buffer size of the one or more journals of the group of journals during the second period;

determining, by the one or more processors, additional buffer space requirements for the one or more journals, based on the event; and automatically re-allocating, by the one or more processors, a portion of buffer space in the common shared storage resource to the one or more journals, based on predictability of the one or more journals during a second monitored period, wherein the second monitored period and the second period share one or more common temporal qualities, the additional space requirements, and the portion of the buffer space available to reclaim.

4. The computer program product of claim 3, further comprising: designating, by one or more programs, the one or more journals previously determined to be predictable for the second monitored periods as unpredictable for the second monitored period.

5. The computer program product of claim 3, wherein automatically re-allocating the portion of buffer space further comprises:

determining, by the one or more processors, an additional buffer space requirement for each journal for the second period, based on the rate of change of actual buffer usage of each journal.

6. The computer program product of claim 3, further comprising:

monitoring, by the one or more processors, a number of times the one or more processors automatically re-allocate buffer space to each of the one or more journals, based on obtaining events related to the one or more journals;

based on the number exceeding a first threshold, designating, by the one or more processors, the one or more journals as rogue; and compressing, by the one or more processors, messages stored in the one or more journals.

7. The computer program product of claim 6, further comprising:

based on the number exceeding a second threshold, rejecting, by the one or more processors, all further incoming messages destined for the one or more journals.

8. A system comprising:

a memory;

one or more processors in communication with the memory; and program instructions executable by the one or more processors via the memory to perform a method, the method comprising:

obtaining, by one or more processors, historical data related to buffer space usage for each journal in a group of journals comprising a messaging system, wherein each journal utilizes buffer space comprising a common shared storage resource, by monitoring activity in each journal over repeating temporal periods;

determining, by the one or more processors, for each journal, based on the obtained historical data, a predictability for each journal for each monitored period of the repeating temporal periods, wherein the predictability is selected from the group consisting of: predictable and unpredictable, wherein a predictable journal, for a monitored period, uses a predictable amount of buffer space during the monitored period, and an unpredictable journal, for the monitored period, uses an unpredictable amount of buffer space during the monitored period;

generating, by the one or more processors, based on the historical data, usage statistics for each journal during each monitored period, wherein the usage statistics generated for each monitored period are dependent on whether the journal was predictable or unpredictable during the monitored period;

for each monitored period, ranking, by the one or more processors, predictable journals for the monitored period, by a buffer space requirement for each journal of the predictable journals;

based on the rankings for a given monitored period, determining, by the one or more processors, a buffer space requirement for each journal of the group of journals for a current period, wherein the current period shares one or more temporal qualities with the given monitored period; and based on the determining, allocating, by the one or more processors, for use during the current period, based on the buffer space requirement for each journal, buffer space to each journal of the group of journals, from the buffer space in the common shared storage resource.

* * * * *